(12) United States Patent
Bae et al.

(10) Patent No.: US 9,321,886 B2
(45) Date of Patent: Apr. 26, 2016

(54) SILANE COMPOUND, METHOD FOR PREPARING THE SAME, AND POLYCARBONATE RESIN COMPOSITION INCLUDING THE SAME

(71) Applicant: Cheil Industries Inc., Gumi-si (KR)

(72) Inventors: Su Hak Bae, Uiwang-si (KR); Sung Hee Ahn, Uiwang-si (KR); Hyun Joo Han, Uiwang-si (KR); Ha Na Ra, Uiwang-si (KR); Hyun Ho Lee, Uiwang-si (KR)

(73) Assignee: Cheil Industries Inc., Gumi-si (KR)

( * ) Notice: Subject to any disclaimer, the term of this patent is extended or adjusted under 35 U.S.C. 154(b) by 0 days.

(21) Appl. No.: 14/612,733

(22) Filed: Feb. 3, 2015

(65) Prior Publication Data

US 2015/0148471 A1 May 28, 2015

Related U.S. Application Data

(63) Continuation-in-part of application No. 14/181,894, filed on Feb. 17, 2014, now abandoned.

(30) Foreign Application Priority Data

Jun. 25, 2013 (KR) .................. 10-2013-0073347
Dec. 13, 2013 (KR) .................. 10-2013-0155764

(51) Int. Cl.
C08G 64/04 (2006.01)
C08G 64/42 (2006.01)
C08L 69/00 (2006.01)
C08G 64/08 (2006.01)

(52) U.S. Cl.
CPC .............. *C08G 64/42* (2013.01); *C08G 64/085* (2013.01); *C08L 69/00* (2013.01)

(58) Field of Classification Search
CPC ..... C08G 64/085; C08G 64/42; C08L 101/10
See application file for complete search history.

(56) References Cited

U.S. PATENT DOCUMENTS

| 8,829,091 B2 | 9/2014 | Ha et al. |
| 2004/0220372 A1 | 11/2004 | Qi et al. |
| 2005/0174880 A1* | 8/2005 | Shioyama ............ C08G 83/001 366/79 |
| 2012/0172508 A1 | 7/2012 | Jung et al. |
| 2014/0378589 A1 | 12/2014 | Bae et al. |

FOREIGN PATENT DOCUMENTS

| CN | 1400249 A | 3/2003 |
| CN | 102558812 A | 7/2012 |
| CN | 103214693 A | 7/2013 |
| JP | 2013-1772 A | 1/2013 |
| KR | 10-2012-0057276 A | 6/2012 |
| KR | 10-2012-0075813 A | 7/2012 |

OTHER PUBLICATIONS

Office Action in counterpart Chinese Application No. 201410054307.X dated Aug. 27, 2015, pp. 1-5.
Office Action in counterpart Taiwanese Application No. 103112763 dated Jun. 23, 2015, pp. 1-3.

* cited by examiner

*Primary Examiner* — Kuo-Liang Peng
(74) *Attorney, Agent, or Firm* — Additon, Higgins & Pendleton, P.A.

(57) ABSTRACT

A silane compound is represented by Formula 1:

$$(R_4O)_a-Si-[(CH_2)_m-Y-O-\underset{(R_2)_p}{\underset{|}{C_6H_4}}-R_1-\underset{(R_3)_q}{\underset{|}{C_6H_4}}-O-\overset{O}{\underset{\|}{C}}-X]_{n\phantom{]}b},$$

wherein each $R_1$ is independently a single bond, an ether group, a carbonyl group, a thioether group, a sulfone group, or a substituted or unsubstituted $C_1$ to $C_{20}$ hydrocarbon group, $R_2$ and $R_3$ are each independently a substituted or unsubstituted $C_1$ to $C_{20}$ hydrocarbon group, each $R_4$ is independently hydrogen or a $C_1$ to $C_5$ hydrocarbon group, each X is independently halogen, a hydroxyl group, $C_1$ to $C_{20}$ alkoxy, or $C_6$ to $C_{20}$ aryloxy, each Y is independently a single bond, an amide group, a thioester group, a hydroxyethylene group, a carbonyl group, an aromatic group or an ester group, a and b are each independently an integer from 1 to 3, a+b is 4, no is an integer from 0 to 5, n is an integer from 5 to 50, and p and q are each independently an integer from 0 to 4.

20 Claims, 1 Drawing Sheet

SILANE COMPOUND, METHOD FOR PREPARING THE SAME, AND POLYCARBONATE RESIN COMPOSITION INCLUDING THE SAME

CROSS-REFERENCE TO RELATED APPLICATIONS

This application is a continuation-in-part of and claims priority from U.S. Ser. No. 14/181,894, filed Feb. 17, 2014, pending, the entire disclosure of which is incorporated herein by reference. This application also claims priority under 35 USC Section 119 to and the benefit of Korean Patent Application No. 10-2013-0073347, filed Jun. 25, 2013, and Korean Patent Application No. 10-2013-0155764, filed Dec. 13, 2013, the entire disclosure of each of which is also incorporated herein by reference.

FIELD OF THE INVENTION

The present invention relates to a silane compound, a method for preparing the same, and a polycarbonate resin composition including the same. More particularly, the present invention relates to a silane compound having a novel structure, a method for preparing the same, and a polycarbonate resin composition that can have an excellent appearance, rigidity, and the like with minimal or no deterioration in flowability through use of the same.

BACKGROUND OF THE INVENTION

When a thermoplastic resin or a thermosetting resin is blended with inorganic fillers such as glass fibers, silica, talc, and the like, the resin may have improved tearing strength, tensile strength, flexural strength, flexural modulus, and the like due to the inherent properties of the inorganic filler. Blending of a thermoplastic resin such as polycarbonate and the like with inorganic fillers is usually performed in a process of preparing a molded article requiring high rigidity. Particularly, the blend can be used as an interior/exterior material for automobiles as well as electric and electronic products.

However, when the resin is blended with inorganic fillers, the resin may have problems during injection molding due to reduced moldability. Specifically, when the resin is injection molded, there is a possibility that inorganic fillers such as glass fibers and the like may protrude from the surface of a molded article, which leads to deterioration in appearance. Thus, the resin is limited to use for production of indoor articles in practice.

Further, when flowability of a thermoplastic resin composition blended with inorganic fillers such as glass fibers and the like is improved, appearance may be enhanced, but there are problems in that mechanical and thermal properties of the resin composition can decrease with the increase of flowability.

Korean Patent Publication No. 10-2012-0075813A discloses a glass fiber-reinforced polycarbonate resin composition including a glass fiber-reinforced polycarbonate resin, a metal salt flame retardant, a fluorinated polyolefin resin, and a mixture of a siloxane compound and a silicone resin composition, and having excellent flame retardancy. Further, Korean Patent Publication No. 10-2012-0057276A discloses a glass fiber-reinforced polycarbonate resin composition having enhanced color stability at high temperatures. These resin compositions can enhance rigidity and flame retardancy through glass fiber reinforcement. However, these resins are poorly suited for exterior is applications due to rapid deterioration in appearance over time.

In order to enhance appearance, injection molding such as rapid heat cycle molding (RECK) and the like may be used. However, this method requires an expensive injection machine and a long molding cycle period, which can reduce productivity.

SUMMARY OF THE INVENTION

The present invention provides a novel silane compound, a method for preparing the same and a polycarbonate resin composition than can have excellent rigidity and appearance with minimal or no deterioration in flowability through use of the silane compound.

The silane compound is represented by Formula 1:

[Formula 1]

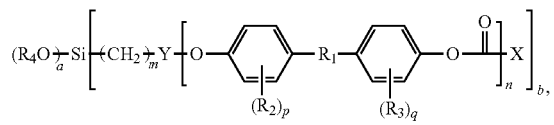

wherein each $R_1$ is independently a single bond, an ether group, a carbonyl group, thioether group, a sulfone group, or a substituted or unsubstituted $C_1$ to $C_{20}$ hydrocarbon group, $R_2$ and $R_3$ are the same or different and are each independently a substituted or unsubstituted $C_1$ to $C_{20}$ hydrocarbon group, each $R_4$ is independently hydrogen or a $C_1$ to $C_5$ hydrocarbon group, each X is independently halogen, a hydroxyl group, $C_1$ to $C_{20}$ alkoxy, or $C_6$ to $C_{20}$ aryloxy, each Y is independently a single bond, an amide group, a thioester group, a hydroxyethylene group, a carbonyl group, an aromatic group or an ester group, a and h are the same or different and are each independently an integer from 1 to 3, a+b is 4, m is an integer from 0 to 5, n is an integer from 5 to 50, and p and q are the same or different and are each independently an integer from 0 to 4.

In one embodiment, each Y may independently be a single bond, an amide group, or a hydroxyethylene group.

In one embodiment, the silane compound may have a weight average molecular weight from about 2,000 g/mol to about 17,000 g/mol.

The present invention also relates to a method for preparing the silane compound. The preparation method includes: reacting a silane compound represented by Formula 2 with an aromatic carbonate compound represented by Formula 3.

[Formula 2]

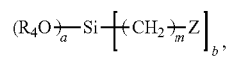

wherein $R_4$, a, b and m are as defined in the formula 1, and each Z is independently halogen, an isocyanate group, a thiocyanate group, an epoxy group, a carboxyl group, or a halogenated carbonyl group.

[Formula 3]

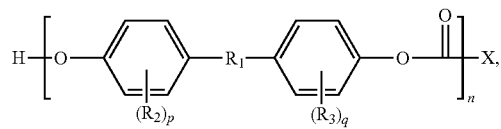

wherein $R_1$, $R_2$, $R_3$, X, n, p and q are as defined in Formula 1.

In one embodiment, reaction may be performed by heating and stirring at a temperature of about 30° C. to about 110° C. in the presence of an organic solvent.

The present invention also relates to a polycarbonate resin composition. The polycarbonate resin composition includes: a polycarbonate resin; a silane compound represented by Formula 1; and an inorganic filler.

In one embodiment, the silane compound may be present in an amount of about 1 part by weight to about 20 parts by weight, and the inorganic filler may be present in an amount of about 5 parts by weight to about 50 parts by weights, each based on about 100 parts by weight of the polycarbonate resin.

The silane compound and the inorganic filler may be present in a weight ratio of about 1:about 4 to about 1:about 30.

In one embodiment, the inorganic filler may include at least one of silica, talc, (glass fibers, mica, wollastonite, basalt fibers, and/or whiskers.

In one embodiment, a portion or the entirety of the silane compound chemically bonded to the inorganic filler.

In one embodiment, the polycarbonate resin composition may have a tensile strength of about 800 kgf/cm² to about 1,500 kgf/cm² measured in accordance with ASTM D638, a flexural strength of about 1,200 kgf/cm² to about 2,000 kgf/cm² measured in accordance with ASTM D790, a flexural modulus of about 30,000 kgf/cm² to about 110,000 kgf/cm² measured in accordance with ASTM D790, an Izod impact strength of about 5 kgf·cm/cm to about 16 kgf·cm/cm as measured on a 1/8" thick specimen in accordance with ASTM D256, an FDI (falling dart impact) strength of about 10 J to about 40 J as measured on an about 1 mm thick specimen in accordance with the DuPont drop test method, and a melt flow index (MI) of about 10 g/10 min to about 80 g/10 min as measured in accordance with ASTM D1238.

DETAILED DESCRIPTION OF THE INVENTION

Figure 1:
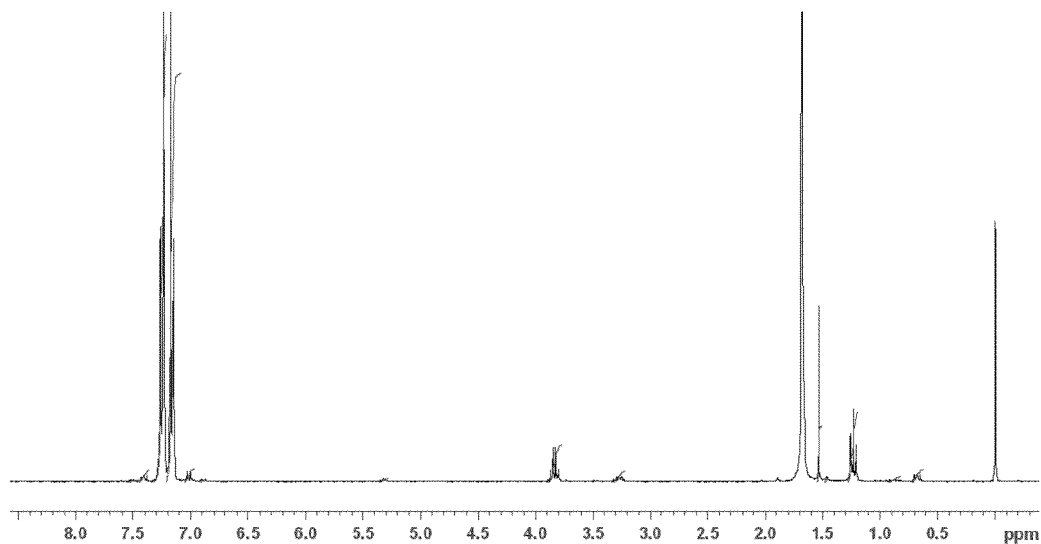
FIG. 1 is an ¹H-NMR spectrum of a silane compound prepared in Preparative Example 1.

The present invention now be described more fully hereinafter in the following detailed description of the invention with reference to the accompanying drawings, in which some, but not all embodiments of the invention are described. Indeed, this invention may be embodied in many different forms and should not be construed as limited to the embodiments set forth herein: rather, these embodiments are provided so that this disclosure will satisfy applicable legal requirements.

The silane compound of the present invention is represented by Formula 1:

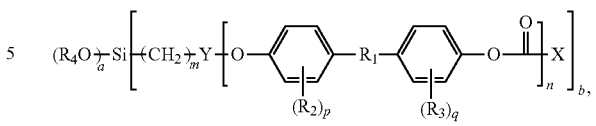

[Formula 1]

wherein each $R_1$ is independently a single bond, an ether group (—O—), a carbonyl group (—CO—), a thioether group (—S—), a sulfone group (—SO$_2$—), or a substituted or unsubstituted $C_1$ to $C_{20}$ hydrocarbon group, for example, $C_1$ to $C_{15}$ alkylene, $C_1$ to $C_{15}$ alkylidene, or $C_5$ to $C_{15}$ cycloalkylidene, $R_2$ and $R_3$ are the same or different and are each independently a substituted or unsubstituted $C_1$ to $C_{20}$ hydrocarbon group, for example, $C_1$ to $C_{15}$ alkyl, $C_1$ to $C_{15}$ alkoxy, $C_3$ to $C_{15}$ cycloalkyl, $C_3$ to $C_{15}$ cycloalkoxy, $C_6$ to $C_{15}$ aryl or $C_6$ to $C_{15}$ aryloxy, for example, methyl, ethyl, methoxy, or ethoxy, each $R_4$ is independently hydrogen or a $C_1$ to $C_5$ hydrocarbon group, for example, methyl, ethyl, propyl, butyl, and the like, each X is independently halogen such as chlorine (Cl), bromine (Br) and the like, a hydroxyl group, $C_1$ to $C_{20}$ alkoxy, for example, $C_1$ to $C_{15}$ alkoxy, or $C_6$ to $C_{20}$ aryloxy, for example, $C_6$ to $C_{15}$ aryloxy, each Y is independently a single bond, an amide group (—NH—CO—), a thioester group (—S—CO—), a hydroxyethylene group (—C(OH)—CH$_2$—), a carbonyl group (—CO—), an aromatic group or an ester group (—O—CO—), and the like, for example, a single bond, an amide group, or a hydroxyethylene group, a and b are the same or different and are each independently an integer from 1 to 3, a+b is 4, for example, a may be 3 and b may be 1, m is an integer from 0 to 5, n is an integer from 5 to 50, for example, 7 to 30, and as another example, 10 to 25, and p and q are the same or different and are each independently an integer from 0 to 4.

As used herein, the term "substituted" means that a hydrogen atom is substituted with a substituent including halogen, $C_1$ to $C_{30}$ alkyl, $C_1$ to $C_{30}$ haloalkyl, $C_6$ to $C_{30}$ aryl, $C_2$ to $C_{30}$ heteroatyl, $C_1$ to $C_{20}$ alkoxy, or a combination thereof.

As used herein, the term "substituted or unsubstituted $C_1$ to $C_{20}$ hydrocarbon group" can refer to, for example, substituted or unsubstituted $C_1$ to $C_{15}$ alkylene, $C_1$ to $C_{15}$ alkylidene, $C_5$ to $C_{15}$ cycloalkylidene, $C_1$ to $C_{15}$ alkyl, $C_1$ to $C_{15}$ alkoxy, $C_3$ to $C_{15}$ cycloalkyl, $C_3$ to $C_{15}$ cycloalkoxy, $C_6$ to $C_{15}$ aryl and/or $C_6$ to $C_{15}$ aryloxy. Also as used herein, the term "aromatic group" can refer to, for example, substituted or unsubstituted $C_6$ to $C_{15}$ aryl.

In one embodiment, X can be a conventional end group of polycarbonate resin polymer molecules. X can be independently halogen, a hydroxyl group, $C_1$ to $C_{20}$ alkoxy, or $C_6$ to $C_{20}$ aryloxy, for example, chlorine (Cl), bromine (Br), $C_1$ to $C_{15}$ alkoxy, or $C_6$ to $C_{15}$ aryloxy. For example, X can be independently a hydroxyl group or phenoxy.

In one embodiment, the silane compound can have a weight average molecular weight (Mw) of about 2,000 g/mol to about 17,000 g/mol, as measured by gel permeation chromatography (GPC), without being limited thereto.

The method for preparing the silane compound according to the present invention includes: reacting a silane compound represented by Formula 2 with an aromatic carbonate compound represented by Formula 3.

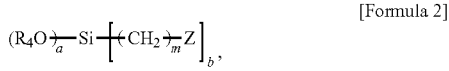
[Formula 2]

wherein $R_4$, a, b and m are as defined in Formula 1, and each Z is independently halogen such as chlorine (Cl), bromine (Br) and the like, an isocyanate group (—N=C=O), thiocyanate group (—S=C=O), an epoxy group, a carboxyl group (—CO—OH), a halogenated carbonyl group (—CO—R':R'=a halogen atom), and the like, for example, halogen, an isocyanate group, an epoxy group, and the like.

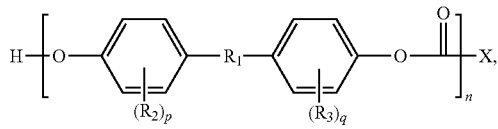
[Formula 3]

wherein $R_1$, $R_2$, $R_3$, X, n, p and q are as defined in Formula 1.

In one embodiment, reaction may be performed by heating and stirring at a temperature of about 30° C. to about 110° C., for example, at about 60° C. to about 100° C., in the presence of an organic solvent for about 1 hour to about 48 hours.

In one embodiment, the aromatic carbonate compound represented by Formula 3 can be prepared by reacting one or more diphenols (diol compounds) with phosgene, halogen formate and/or carbonate diester.

Examples of the diphenols may include without limitation 4,4"-biphenol, 2,2-bis(4-hydroxyphenyl)propane, 2,4-bis(4-hydroxyphenyl)-2-methylbutane, 1,1-bis(4-hydroxyphenyl)cyclohexane, 2,2-bis(3-chloro-4-hydroxyphenyl)propane, 2,2-bis(3,5-dichloro-4-hydroxyphenyl)propane, and the like, and mixtures thereof. For example, the diphenol may include 2,2-bis(4-hydroxyphenyl)propane, 2,2-bis(3,5-dichloro-4-hydroxyphenylpropane, and/or 1,1-bis(4-hydroxyphenyl)cyclohexane, for example, 2,2-bis(4-hydroxyphenyl)propane, which is referred to as bisphenol-A.

The aromatic carbonate compound may have a branched chain, and may be prepared, for example, by adding about 0.05 mol % to about 2 mol % of a tri- or more polyfunctional compound, for example, a compound having three or more phenol groups.

The aromatic carbonate compound may be used in the form of a homo polycarbonate resin, a co-polycarbonate resin, or a blend thereof.

Furthermore, the aromatic carbonate compound may be replaced partially or wholly with an aromatic polyester-carbonate resin obtained by polymerization in the presence of an ester precursor, for example, bifunctional carboxylic acid.

The aromatic carbonate compound may have a weight average molecular weight (Mw) of about 1,500 g/mol to about 15,000 g/mol, for example, about 3,000 g/mol to about 5,000 g/mol, without being limited thereto.

Examples of the organic solvent may include without limitation tetrahydrofuran (THF), 1,4-dioxane, dichloromethane ($CH_2Cl_2$), trichloromethane ($CHCl_3$), chlorobenzene, and the like, and mixtures thereof. For example, tetrahydrofuran and/or 1,4-dioxane may be used as the organic solvent.

The organic solvent may be used in an amount of about 200 parts by weight to about 1,000 parts by weight, based on about 100 parts by weight of the silane compound represented by Formula 2 and the aromatic carbonate compound represented by Formula 3, without being limited thereto.

Furthermore, the reaction may be performed in the presence of a catalyst, if necessary. Examples of the catalyst may include, without limitation, an amine catalyst, such as pyridine, triethylamine, diethylamine, and the like, and mixtures thereof. The catalyst may be used in an amount of about 0.1 parts by weight to about 30 parts by weight, based on about 100 parts by weight of the shine compound represented by Formula 2 and the aromatic carbonate compound represented by Formula 3, without being limited thereto.

In one embodiment, the molar ratio of the compound represented by Formula 2 to the aromatic carbonate compound represented by Formula. 3 may depend upon the amount of the silane compound. For example, the molar ratio may be about 1:about 1 to about 1:about 10.

The polycarbonate resin composition according to the present invention may include a polycarbonate resin, a silane compound represented by Formula 1, and an inorganic filler.

As used herein, the polycarbonate resin can be a typical thermoplastic polycarbonate resin. For example, an aromatic polycarbonate resin prepared by reacting one or more diphenols (diol compounds) with phosgene, halogen formate and/or carbonate diester may be used as the polycarbonate resin.

Examples of the diphenols may include without limitation 4,4'-biphenol, 2,2-bis(4-hydroxyphenyl)propane, 2,4-bis(4-hydroxyphenyl)-2-methylbutane, 1,1-bis(4-hydroxyphenyl)cyclohexane, 2,2-bis(3-chloro-4-hydroxyphenyl)propane, 2,2-bis(3,5-dichloro-4-hydroxyphenyl)propane, and the like, and mixtures thereof. For example, the diphenol may include 2,2-bis(4-hydroxyphenyl)propane, 2,2-bis(3,5-dichloro-4-hydroxyphenyl)propane, and/or 1,1-bis(4-hydroxyphenyl)cyclohexane, for example, 2,2-bis(4-hydroxyphrhyl)propane, which is referred to as bisphenol-A.

The polycarbonate resin may have a branched chain, and may be prepared, for example, by adding about 0.05 mol % to about 2 mol % of a tri- or more polyfunctional compound, for example, a compound having three or more phenol groups.

The polycarbonate resin may be used in the form of a homo polycarbonate resin, a co-polycarbonate resin, or a blend thereof.

Furthermore, the polycarbonate resin may be replaced partially or wholly with an aromatic polyester-carbonate resin obtained by polymerization in the presence of an ester precursor, for example, bifunctional carboxylic acid.

The polycarbonate resin may have a weight average molecular weight (Mw) of about 10,000 g/mol to about 200,000 g/mol, for example, about 15,000 g/mol to about 80,000 g/mol, without being limited thereto.

In this invention, the silane compound represented by Formula 1 may serve as a compatibilizer or a coupling agent in the polycarbonate resin composition, which enhances interface adhesion between the polycarbonate and the inorganic filler while increasing rigidity with minimal or no deterioration in flowability.

In one embodiment, the silane compound may be present in an amount of about 1 part by weight to about 20 parts by weight, for example, about 2 parts by weight to about 10 parts by weight, based on about 100 parts by weight of the polycarbonate resin. In some embodiments, the polycarbonate resin composition may include the silane compound in an amount of about 1, 2, 3, 4, 5, 6, 7, 8, 9, 10, 11, 12, 13, 14, 15, 16, 17, 18, 19, or 20 parts by weight. Further, according to some embodiments of the present invention, the amount of the silane compound can be in a range from about any of the foregoing amounts to about any other of the foregoing amounts.

When the polycarbonate resin composition includes the silane compound in an amount within this range, the polycarbonate resin composition can exhibit excellent rigidity with minimal or no deterioration in flowability.

As used herein, the inorganic filler refers to a material capable of forming a chemical bond through condensation with a hydroxyl group of the silane compound. Examples of the inorganic filler may include without limitation silica, talc, glass fibers, mica, wollastonite, basalt fibers, whiskers, and the like and mixtures thereof. For example, the inorganic filler may include silica, talc, glass fibers, mica, basalt fibers, or a mixture thereof.

In one embodiment, the inorganic filler may have an average particle size of, for example, about 50 nm to about 100 µm, without being limited thereto.

In one embodiment, the glass fibers may refer to a glass fiber reinforcing agent in which glass filaments coated with a sizing agent such as an epoxy, urethane, silane and the like form fibers. The glass filaments may have an average diameter (D) of about 5 µm to about 20 µm (aspect ratio (L/D): about 5~about 60). The glass fiber reinforcing agent may have an average diameter (D) of about 10 µm to about 13 µm (aspect ratio (L/D): about 5~about 60), without being limited thereto. Further, the sizing agent may be present in an amount of about 0.05 parts by weight to about 0.1 parts by weight, based on about 100 parts by weight of the glass filament.

In one embodiment, the inorganic filler may be present in an amount of about 5 parts by weight to about 50 parts by weight, for example, about 10 parts by weight to about 30 parts by weight, based on about 100 parts by weight of the polycarbonate resin. In some embodiments, the polycarbonate resin composition may include the inorganic filler in an amount of about 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 parts by weight. Further, according to some embodiments of the present invention, the amount of the inorganic filler can be in a range from about any of the foregoing amounts to about any other of the foregoing amounts.

When the polycarbonate resin composition includes the inorganic filler in an amount within this range, the resin composition can exhibit excellent appearance and rigidity with minimal or no deterioration in flowability.

In addition, the weight ratio of the silane compound to the inorganic filler (silane compound:inorganic filler) may be about 1:about 4 to about 1:about 30, for example, about 1:about 4 to about 1:about 20. Within this range, the resin composition can exhibit further enhanced rigidity, flowability, appearance, and the like.

The thermoplastic resin composition according to the invention may further include one or more additives such as but not limited to flame retardant aids, lubricants, plasticizers, heat stabilizers, anti-dripping agents, antioxidants, compatibilizers, light stabilizers, pigments, dyes, and the like, as needed. These additives may be used alone or in combination thereof. For example, the additives may be used in an amount of about 0.1 parts by weight to about 10 parts by weight based on about 100 parts by weight of the base resin, without being limited thereto.

In the polycarbonate resin composition of the present invention, a portion or the entirety of the silane compound may be chemically bonded to the inorganic filler. For example, the polycarbonate resin composition may be obtained in pellet form by mixing the components and melt-extruding the mixture in a typical twin-screw extruder at a temperature of about 200° C. to about 280° C., for example, about 250° C. to about 260° C. At this extrusion temperature, a silane group of the slime compound and a hydroxyl group of the inorganic filler may undergo condensation to form covalent bonding on the surface of the inorganic filler, followed by dehydration condensation during extrusion and drying.

The pelletized resin composition may be used to produce various molded articles through various molding methods, such as injection molding, extrusion molding, vacuum molding, cast molding, and the like. These methods are well-known to those skilled in the art.

In one embodiment, the polycarbonate resin composition may have a tensile strength of about 800 kgf/cm$^2$ to about 1,500 kgf/cm$^2$, for example, about 800 kgf/cm$^2$ to about 1,200 kgf/cm$^2$, and as another example, about 900 kgf/cm$^2$ to about 1,000 kg/cm$^2$ measured in accordance with ASTM D638, a flexural strength of about 1,200 kgf/cm$^2$ to about 2,000 kgf/cm$^2$, for example, about 1,300 kgf/cm$^2$ to about 1,800 kgf/cm$^2$ measured in accordance with ASTM D790, and/or a flexural modulus of about 30,000 kgf/cm$^2$ to about 110,000 kgf/cm$^2$, for example, about 40,000 kgf/cm$^2$ to about 75,000 kgf/cm$^2$ also as measured in accordance with ASTM D790.

Further, the polycarbonate resin composition may have an Izod impact strength of about 5 kgf/cm$^2$ to about 16 kgf/cm$^2$, as measured on an about 1/8" thick specimen in accordance with ASTM D256.

The polycarbonate resin composition may have an EDT (falling dart impact) strength of about 10 J to about 40 J, for example, about 20 J to about 30 J, as measured on an about 1 mm thick specimen (about 10 cm×about 10 cm×about 1 mm) using 2 kg dart in accordance with the DuPont drop test method. In this FDI strength test, a dart having a predetermined weight is dropped onto an about 1 mm thick specimen from an adjusted height to observe the occurrence of cracking with the naked eye. The maximum height at which cracking does not occur is measured to calculate potential energy (DuPont drop test method).

Further, the polycarbonate resin composition may have a melt flow index (MI) of about 10 g/10 min to about 80 g/10 min, for example, about 20 g/10 min to about 50 g/10 min, as measured in accordance with ASTM D1238.

Next, the present invention will be explained in more detail with reference to the following examples. However, it should be understood that these examples are provided for illustration only and are not to be in any way construed as limiting the present invention. Descriptions of details apparent to those skilled in the art will be omitted herein.

EXAMPLES

Preparative Example A

Preparation of Aromatic Carbonate Compound 1.6 kg of 2,2-bis(4-hydroxyphenyl)propane (bisphenol A), 1.2 kg of diphenyl carbonate, and 100 ppb of KOH (based on 1 kg of bisphenol A) are sequentially added to a reactor, and oxygen in the reactor is removed using nitrogen. The reactor is heated to 180° C. and then to 210° C., at Which temperature the reaction is performed for 1 hour. After 1 hour, the reactor is further heated to 220° C. and maintained at 650 mbar for 3 hours. The reactor is then heated to 230° C. and maintained at 450 mbar for 2 hours, then is decompressed to 1 atm. maintained for 1 hour, and then cooled to 25° C. for about 60 minutes to prepare an aromatic carbonate compound represented by Formula 3a (n=10).

[Formula 3a]

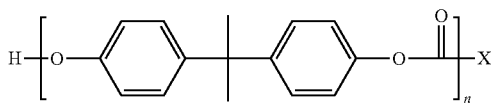

Formula 3a, X is as defined in Formula 1.

Preparative Example B

Preparation of Aromatic Carbonate Compound 1.6 kg of 2,2-bis(4-hydroxyphenyl)propane (bisphenol A), 1.2 kg of diphenyl carbonate, and 100 ppb of KOH (based on 1 kg of bisphenol A) are sequentially added to a reactor, and oxygen in the reactor is removed using nitrogen. The reactor is heated to 180° C. and then to 210° C., at which temperature the reaction is performed for 1 hour. After 1 hour, the reactor is further heated to 220° C. and maintained at 650 mbar for 3 hours. The reactor is then heated to 230° C. and maintained at 400 mbar for 2 hours, then is decompressed to 1 atm. maintained for 1 hour, and then cooled to 25° C. for about 60 minutes to prepare an aromatic carbonate compound represented by Formula 3a (n=20).

Preparative Example C

Preparation of Aromatic Carbonate Compound 1.6 kg of 2,2-bis(4-hydroxyphenyl)propane (bisphenol A), 1.2 kg of diphenyl carbonate, and 100 ppb of KOH (based on 1 kg of bisphenol A) are sequentially added to a reactor, and oxygen in the reactor is removed using nitrogen. The reactor is heated to 180° C. and then to 210° C., at which temperature the reaction is performed for 1 hour. After 1 hour, the reactor is further heated to 220° C. and maintained at 650 mbar for 3 hours. The reactor is then heated to 230° C. and maintained at 300 mbar for 2 hours, then is decompressed to 1 atm. maintained for 1 hour, and then cooled to 25° C. for about 60 minutes to prepare an aromatic carbonate compound represented by Formula 3a (n=30).

Preparative Example 1

Preparation of Saline Compound 240 g (1.0 mole) of a silane compound represented by Formula 2a and 760 g (0.3 mole) of an aromatic carbonate compound represented by Formula 3a (n=10) prepared in Preparative Example A are dissolved in 1,4-dioxane solvent and stirred at 100° C. for 24 hours to prepare a silane compound (n=10) represented by Formula 1a (yield: 99%, weight average molecular weight (measured by GPC): 5,300 g/mol). An $^1$H-NMR spectrum of the prepared a silane compound represented by Formula 1a is measured, and results are shown in FIG. 1.

In Formula 1a, X is as defined in Formula 1.

[Formula 1a]

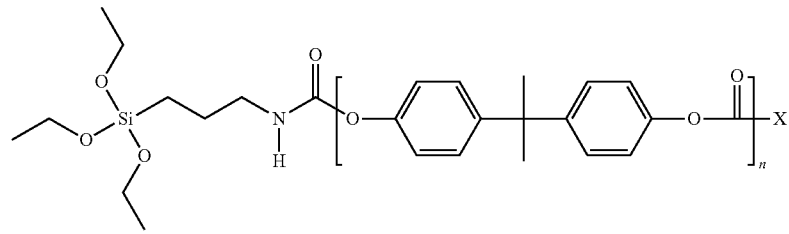

[Formula 2a]

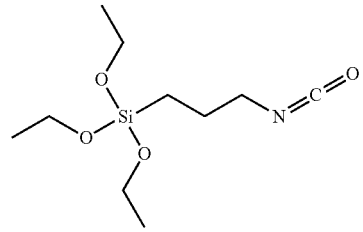

Preparative Example 2

Preparation of Silane Compound

A silane compound (n=20) represented by Formula 1a is prepared in the same manner as in Preparative Example 1 except that 760 g (0.15 mole) of the aromatic carbonate compound represented by Formula 3a (n=20) prepared in Preparative Example B is used instead of 760 g (0.3 mole) of the aromatic carbonate compound (n=10) represented by Formula 3a (yield: 98%, weight average molecular weight: 10,300 g/mol).

Preparative Example 3

Preparation of Silane Compound

A silane compound (n=30) represented by Formula 1a is prepared in the same manner as in Preparative Example 1 except that 760 g (0.1 mole) of the aromatic carbonate compound represented by Formula 3a (n=30) prepared in Preparative Example C is used instead of 760 g (0.3 mole) of the aromatic carbonate compound (n=10) represented by Formula 3a (yield: 96%, weight average molecular weight: 15,300 g/mol).

Details of e components used in the Examples and Comparative Examples are as follows.

(A) Polycarbonate resin

A bisphenol-A polycarbonate (SC-1190, Cheil Industries, Co. Ltd., Melt index (MI, measured at 300° C. under a load of 1.2 kg in accordance with ISO 1133): 20 g/10 min) is used.

(B) Silane compound

Silane compounds ((B1) to (B3)) prepared in Preparative Examples 1 to 3 are used.

(C) Inorganic filler (C1) Talc (KC-3000, Coach Co. Ltd.)

(C2) Mica (200-BK, Suzolite)

(C3) Glass fibers: Epoxy-coated glass fiber reinforcing agent (C532 KCC)

Examples 1 to 8 and Comparative Examples 1 to 6

The components are mixed in amounts as listed in Tables 1 and 2, followed by extrusion of the mixture at 200° C. to 280° C. to prepare pellets. A twin-screw extruder having a diameter of 45 mm and L/D=36 is used for extrusion. The prepared pellets are dried at 70° C. for 2 hours and injection-molded in a 6 oz injection molding machine (molding temperature: 290° C., mold temperature: 60° C.) to prepare specimens. The physical properties of the prepared specimens are evaluated as follows Results are shown in Tables 1 and 2.

Measurement of Physical Properties (1) Izod impact strength (unit: kgf·cm/cm): Izod impact strength is measured on a ⅛ thick notched Izod specimen in accordance with ASTM D256.

(2) FDI (Falling Dart Impact) strength (unit: J): FDI strength is measured by dropping a 2 kg dart onto a 1 mm thick specimen (10 cm×10 cm×1 mm) and measuring the height of dart, at which cracking does not occur, to calculate potential energy in accordance with DuPont drop test method.

(3) Tensile strength (unit: kgf/cm$^2$): Tensile strength is measured at 5 mm/minute in accordance with ASTM D638.

(4) Flexural modulus and flexural strength (unit: kgf/cm$^2$): Flexural modulus and flexural strength are measured at 2.8 mm/minute in accordance with ASTM D790.

(5) Melt flow index (MI, unit: g/10 minutes): Melt flow index is measured at 300° C. and under a load of 5 kg in accordance with ASTM D1238.

Figure 2:
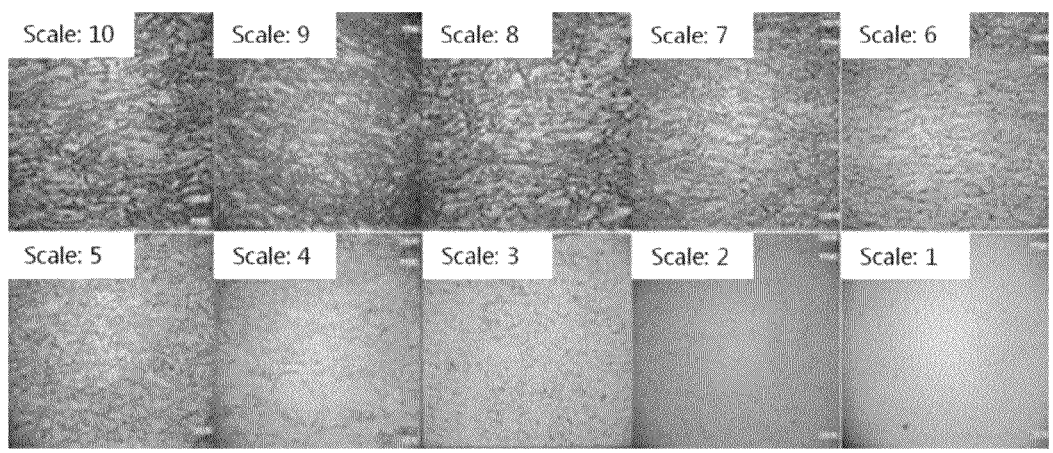
FIG. 2 depicts micrographs of specimens captured using an optical microscope at a central surface region (2 cm×2 cm) of the injection molded specimens (6 cm×6 cm) of polycarbonate compositions prepared in Examples and Comparative Examples, in which the appearance of each specimen was graded on a scale of 1 to 10.

(6) Appearance evaluation: A central surface region (2 cm×2 cm) of an injection-molded specimen (6 cm×6 cm) is observed using an optical microscope. FIG. 2 depicts photographs of specimens, in which central surface regions (2 cm×2 cm) of injection-molded specimens (6 cm×6 cm) of the polycarbonate compositions prepared in Examples and Comparative Examples are photographed and appearance is evaluated on a scale of 1 to 10, 1 being the best (excellent) and 10 being the worst (poor).

TABLE 1

|  |  | Example | | | | | | | |
|---|---|---|---|---|---|---|---|---|---|
|  |  | 1 | 2 | 3 | 4 | 5 | 6 | 7 | 8 |
| (A) Polycarbonate |  | 100 | 100 | 100 | 100 | 100 | 100 | 100 | 100 |
| (B) Silane-based compound | (B1) | 2 | 4 | 6 | 6 | 6 | 6 | — | — |
|  | (B2) | — | — | — | — | — | — | 4 | — |
|  | (B3) | — | — | — | — | — | — | — | 4 |
| (C) Inorganic filler | (C1) | 25 | 25 | 25 | — | 10 | — | 25 | 25 |
|  | (C2) | — | — | — | 25 | — | — | — | — |
|  | (C3) | — | — | — | — | 15 | 30 | — | — |
| Izod impact strength |  | 6.0 | 7.5 | 9.5 | 9.0 | 10 | 15 | 7.0 | 7.1 |
| FDI strength |  | 20 | 26 | 32 | 30 | 20 | 15 | 24 | 22 |
| Tensile strength |  | 960 | 1000 | 1100 | 1150 | 1200 | 1400 | 1050 | 1060 |
| Flexural strength |  | 1580 | 1600 | 1620 | 1650 | 1750 | 1800 | 1590 | 1620 |
| Flexural modulus |  | 52000 | 51000 | 51500 | 59000 | 60000 | 73000 | 52000 | 51000 |
| Melt index |  | 50 | 48 | 47 | 48 | 40 | 36 | 45 | 42 |
| Appearance (Scale of 1 to 10) |  | 2 | 1 | 1 | 2 | 3 | 5 | 2 | 2 |

Units: parts by weight

TABLE 2

|  |  | Comparative Example | | | | | |
|---|---|---|---|---|---|---|---|
|  |  | 1 | 2 | 3 | 4 | 5 | 6 |
| (A) Polycarbonate |  | 100 | 100 | 100 | 100 | 100 | 100 |
| (C) Inorganic filler | (C1) | 25 | — | 10 | — | 10 | — |
|  | (C2) | — | 25 | — | — | — | 10 |
|  | (C3) | — | — | 15 | 30 | — | — |
| Izod impact strength |  | 4.0 | 3.5 | 7.0 | 11 | 6.0 | 5.5 |
| FDI strength |  | 8 | 4 | 5 | 5 | 15 | 15 |
| Tensile strength |  | 800 | 850 | 1100 | 1200 | 650 | 680 |
| Flexural strength |  | 1450 | 1500 | 1600 | 1750 | 900 | 920 |
| Flexural modulus |  | 52000.0 | 55000 | 58000 | 71000 | 28000 | 31000 |
| Flow Index |  | 48 | 45 | 38 | 35 | 75 | 70 |
| Appearance (scale of 1 to 10) |  | 2 | 2 | 6 | 10 | 1 | 1 |

Unit: parts by weight

From the above results, be seen that the polycarbonate resin compositions including the silane compound of the present invention exhibit excellent rigidity, flowability, and appearance with a scale of 1 to 5.

Conversely, the polycarbonate resin compositions of Comparative Examples, which do not include the silane compound, have low Izod impact strength and FDI strength (Comparative Examples 1 and 2) or low tensile strength, flexural strength or flexural modulus (Comparative Examples 5 and 6), as compared to the polycarbonate resin compositions of the present invention. In addition, when glass fibers (C3) are used as the inorganic filler, the composition has decreased FDI strength, flowability and appearance (Comparative Examples 3 and 4).

Many modifications and other embodiments of the invention will come to mind to one skilled in the art to which this invention pertains having the benefit of the teachings presented in the foregoing description. Therefore, it is to be understood that the invention is not to be limited to the specific embodiments disclosed and that modifications and other embodiments are intended to be included within the scope of the appended claims.

What is claimed is:

1. A silane compound represented by Formula 1:

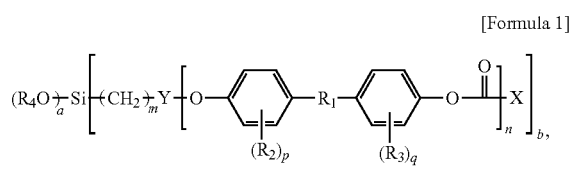

[Formula 1]

wherein each $R_1$ is independently a single bond, an ether group, a carbonyl group, a thioether group, a sulfone group, or a substituted or unsubstituted $C_1$ to $C_{20}$ hydrocarbon group, $R_2$ and $R_3$ are the same or different and are each independently a substituted or unsubstituted $C_1$ to $C_{20}$ hydrocarbon group, each $R_4$ is independently hydrogen or a $C_1$ to $C_5$ hydrocarbon group, each X is independently halogen, a hydroxyl group, $C_1$ to $C_{20}$ alkoxy, or $C_6$ to $C_{20}$ aryloxy, each Y is independently a single bond, an amide group, a thioester group, a hydroxyethylene group, a carbonyl group, an aromatic group or an ester group, a and b are the same or different and are each independently an integer from 1 to 3, a+b is 4, m is an integer from 0 to 5, n is an integer from 5 to 50, and p and q are the same or different and are each independently an integer from 0 to 4.

2. The silane compound according to claim 1, wherein each Y is independently a single bond, an amide group, or a hydroxyethylene group.

3. The silane compound according to claim 1, wherein the silane compound has a weight average molecular weight from about 2,000 g/mol to about 17,000 g/mol.

4. The silane compound according to claim 1, wherein X is a hydroxyl group.

5. The silane compound according to claim 1, wherein X is $C_6$ to $C_{20}$ aryloxy.

6. A method for preparing a silane compound of Formula 1, comprising: reacting a silane compound represented by Formula 2 with an aromatic carbonate compound represented by Formula 3;

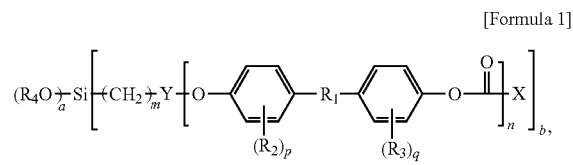

[Formula 1]

wherein each $R_1$ is independently a single bond, an ether group, a carbonyl group, a thioether group, a sulfone group, or a substituted or unsubstituted $C_1$ to $C_{20}$ hydrocarbon group, $R_2$ and $R_3$ are the same or different and are each independently a substituted or unsubstituted $C_1$ to $C_{20}$ hydrocarbon group, each $R_4$ is independently hydrogen or a $C_1$ to $C_5$ hydrocarbon group, each X is independently halogen, a hydroxyl group, $C_1$ to $C_{20}$ alkoxy, or $C_6$ to $C_{20}$ aryloxy, each Y is independently a single bond, an amide group, a thioester group, a hydroxyethylene group, a carbonyl group, an aromatic group or an ester group, a and b are the same or different and are each independently an integer from 1 to 3, a+b is 4, m is an integer from 0 to 5, n is an integer from 5 to 50, and p and q are the same or different and are each independently an integer from 0 to 4;

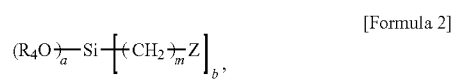

[Formula 2]

wherein $R_4$, a, b and m are as defined in formula 1, and each Z is independently halogen, an isocyanate group, a thiocyanate group, an epoxy group, a carboxyl group, or a halogenated carbonyl group;

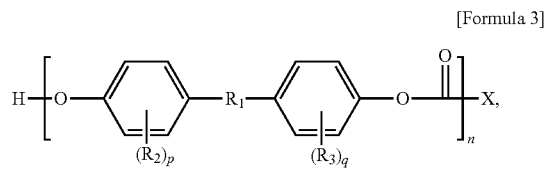

[Formula 3]

wherein $R_1$, $R_2$, $R_3$, X, n, p and q are as defined in formula 1.

7. The method according to claim 6, wherein the reaction is performed by heating and stirring at a temperature of about 30° C. to about 110° C. in the presence of an organic solvent.

8. The method according to claim 6, wherein X is a hydroxyl group.

9. The method according to claim 6, wherein X is $C_6$ to $C_{20}$ aryloxy.

10. A polycarbonate resin composition, comprising:
a polycarbonate resin;
a silane compound of Formula 1; and
an inorganic filler;

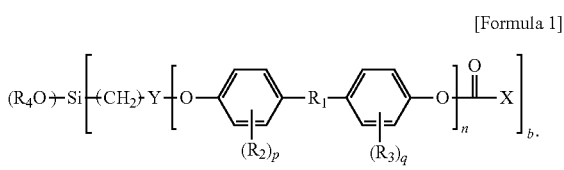

[Formula 1]

wherein each $R_1$ is independently a single bond, an ether group, a carbonyl group, a thioether group, a sulfone group, or a substituted or unsubstituted $C_1$ to $C_{20}$ hydrocarbon group, $R_2$ and $R_3$ are the same or different and are each independently a substituted or unsubstituted $C_1$ to $C_{20}$ hydrocarbon group, each $R_4$ is independently hydrogen or a $C_1$ to $C_5$ hydrocarbon group, each X is independently halogen, a hydroxyl group, $C_1$ to $C_{20}$ alkoxy, or $C_6$ to $C_{20}$ aryloxy, each Y is independently a single bond, an amide group, a thioester group, a hydroxyethylene group, a carbonyl group, an aromatic group or an ester group, a and b are the same or different and are each independently an integer from 1 to 3, a+b is 4, m is an integer from 0 to 5, n is an integer from 5 to 50, and p and q are the same or different and are each independently an integer from 0 to 4.

11. The polycarbonate resin composition according to claim 10, comprising:
about 1 part by weight to about 20 parts by weight of the silane compound, and about 5 parts by weight to about 50 parts by weights of the inorganic filler, each based on about 100 parts by weight of polycarbonate resin.

12. The polycarbonate resin composition according to claim 11, wherein the silane compound and the inorganic filler are present in a weight ratio of about 1:about 4 to about 1:about 30.

13. The polycarbonate resin composition according to claim 10, wherein the inorganic filler comprises silica, talc, glass fibers, mica, wollastonite, basalt fibers, whiskers, or a mixture thereof.

14. The polycarbonate resin composition according to claim 10, wherein a portion or the entirety of the silane compound is chemically bonded to the inorganic filler.

15. The polycarbonate resin composition according to claim 10, wherein the polycarbonate resin composition has a tensile strength of about 800 $kgf/cm^2$ to about 1,500 $kgf/cm^2$ measured in accordance with ASTM D638, a flexural strength of about 1,200 $kgf/cm^2$ to about 2,000 $kgf/cm^2$ measured in accordance with ASTM D790, a flexural modulus of about 30,000 $kgf/cm^2$ to about 110,000 $kgf/cm^2$ measured in accordance with ASTM D790, an Izod impact strength of about 5 kgf cm/cm to about 16 kgf cm/cm as measured on a 1/8" thick specimen in accordance with ASTM D256, an FDI (falling dart impact) strength of about 10 J to about 40 J as measured on an about 1 mm thick specimen in accordance with the DuPont drop test method, and a melt flow index (MI) of about 10 g/10 min to about 80 g/10 min as measured in accordance with ASTM D1238.

16. The polycarbonate resin composition according to claim 10, wherein X is a hydroxyl group.

17. The polycarbonate resin composition according to claim 10, wherein X is $C_6$ to $C_{20}$ aryloxy.

18. The silane compound according to claim 1, wherein $R_1$ is a substituted or unsubstituted $C_1$ to $C_{20}$ hydrocarbon group; X is $C_6$ to $C_{20}$ aryloxy; and Y is an amide group.

19. The method according to claim 6, wherein $R_1$ is a substituted or unsubstituted $C_1$ to $C_{20}$ hydrocarbon group; X is $C_6$ to $C_{20}$ aryloxy; and Y is an amide group.

20. The polycarbonate resin composition according to claim 10, wherein $R_1$ is a substituted or unsubstituted $C_1$ to $C_{20}$ hydrocarbon group; X is $C_6$ to $C_{20}$ aryloxy; and Y is an amide group.

* * * * *